(12) United States Patent
Taoka et al.

(10) Patent No.: US 12,319,007 B2
(45) Date of Patent: Jun. 3, 2025

(54) METHOD FOR PRODUCING RESIN PART

(71) Applicants: Nichia Corporation, Anan (JP); Laser Systems Inc., Anan (JP)

(72) Inventors: Ryota Taoka, Komatsushima (JP); Ryota Takao, Anan (JP); Minoru Yamamoto, Anan (JP); Hiroaki Tamemoto, Anan (JP); Hiroshi Yaguchi, Kawasaki (JP)

(73) Assignees: NICHIA CORPORATION, Anan (JP); LASER SYSTEMS INC., Anan (JP)

( * ) Notice: Subject to any disclaimer, the term of this patent is extended or adjusted under 35 U.S.C. 154(b) by 210 days.

(21) Appl. No.: 18/343,299

(22) Filed: Jun. 28, 2023

(65) Prior Publication Data

US 2024/0001622 A1 Jan. 4, 2024

(30) Foreign Application Priority Data

Jun. 30, 2022 (JP) ................. 2022-105867

(51) Int. Cl.
*B29C 65/16* (2006.01)
*B23K 26/082* (2014.01)
*B23K 26/324* (2014.01)

(52) U.S. Cl.
CPC ........ *B29C 65/1661* (2013.01); *B23K 26/082* (2015.10); *B23K 26/324* (2013.01); *B29C 65/1638* (2013.01)

(58) Field of Classification Search
CPC ............ B29C 65/1661; B29C 65/1638; B29C 65/1658; B29C 65/1667; B23K 26/082; B23K 26/0736
See application file for complete search history.

(56) References Cited

U.S. PATENT DOCUMENTS

2013/0098547 A1 4/2013 Matsuo et al.

FOREIGN PATENT DOCUMENTS

| JP | 2002-331588 A | 11/2002 |
| JP | 2005-161620 A | 6/2005 |
| JP | 2009-226475 A | 10/2009 |
| JP | 2010-046701 A | 3/2010 |
| JP | 2012-027447 A | 2/2012 |
| JP | 2013-136103 A | 7/2013 |

*Primary Examiner* — Daniel McNally
(74) *Attorney, Agent, or Firm* — Foley & Lardner LLP

(57) ABSTRACT

A method for producing a resin part includes: preparing an intermediate body comprising a first member and a second member, the first member containing a resin; and welding the first member with the second member by performing scanning of the intermediate body with a first laser beam and a second laser beam. In the welding of the first member with the second member, the scanning with the first laser beam and the second laser beam is performed in a state in which a center of a second spot is located on a rear side in a direction of the scanning with the first laser beam and the second laser beam as compared to a center of a first spot while at least a part of the first spot and at least a part of the second spot overlap with each other.

20 Claims, 5 Drawing Sheets

METHOD FOR PRODUCING RESIN PART

CROSS-REFERENCE TO RELATED APPLICATIONS

This application claims priority to Japanese Patent Application No. 2022-105867, filed on Jun. 30, 2022, the disclosure of which including the specification, drawings and abstract is incorporated herein by reference in its entirety.

SUMMARY

The present disclosure relates to a method for producing a resin part.

A part made of resin (herein simply referred to as "resin part") is used in various applications. For producing such a resin part, it is required to join resins together or a resin with another member.

Laser welding is one of the methods for joining a member made of resin (herein simply referred to as "resin member") and another member (see, for example, Japanese Patent Publication No. 2012-27447). The laser welding described in Japanese Patent Publication No. 2012-27447 allows a resin member to absorb water and irradiates the resin member with a near-infrared or infrared laser beam. The temperature of water in the region irradiated with the laser beam increases due to a photothermal effect, and the resulting heat melts the resin. The laser-irradiated region of the resin member is brought into close contact with another member to join the resin member with the other member.

SUMMARY

An object of the present disclosure is to provide a method for producing a resin part, and the method is capable of efficient joining of a member containing a resin to another member without using an additive or performing special treatment.

According to one embodiment of the present invention, a method for producing a resin part includes: preparing an intermediate body including a first member and a second member, the first member containing a resin; and welding the first member with the second member by performing scanning of the intermediate body with a first laser beam and a second laser beam, wherein when a first spot is defined as a spot of the first laser beam on a front surface of the intermediate body and a second spot is defined as a spot of the second laser beam on the front surface of the intermediate body, in the welding of the first member with the second member, the scanning with the first laser beam and the second laser beam is performed in a state in which a center of the second spot is located on a rear side in a direction of the scanning with the first laser beam and the second laser beam as compared to a center of the first spot while at least a part of the first spot and at least a part of the second spot overlap with each other, and at least one of the first spot and the second spot has a maximum length in a direction parallel to the direction of the scanning longer than a maximum length in a direction perpendicular to the direction of the scanning.

According to an embodiment of the method for producing a resin part of the present invention, it is possible to efficiently join a member containing resin with another member by a simple method without using an additive or performing special treatment. Various resin parts thus can be produced.

DETAILED DESCRIPTION

The present disclosure relates to a method for producing a resin part. Hereinafter, an exemplary method for producing a resin part according to an embodiment of the present invention will be described; however, the present invention is not limited to the embodiment.

The method for producing a resin part according to the embodiment of the present invention includes the following steps: preparing (hereinafter also referred to as an "intermediate body preparing step") an intermediate body including a first member containing a resin and a second member; and welding (hereinafter also referred to as a "welding step") the first member with the second member by scanning the front surface of the intermediate body with at least two laser beams in a predetermined direction (herein referred to as a "scanning direction"). The following description explains the case where the intermediate body is irradiated with two laser beams as an example; however, the intermediate body may be irradiated with three or more laser beams in the method for producing a resin part according to the present embodiment.

Herein, when the centers of spots that are formed on the front surface of the intermediate body and by the two lasers are specified, a laser beam having the spot center thereof on the front side in the scanning direction is referred to as a first laser beam, and a laser beam having the spot center thereof on the rear side in the scanning direction is referred to as a second laser beam. In addition, a spot formed on the front surface of the intermediate body and by the first laser beam is referred to as a first spot, and a spot formed on the front surface of the intermediate body and by the second laser beam is referred to as a second spot. The center of the spot is synonymous with the center of gravity of the spot.

Figure 1A:
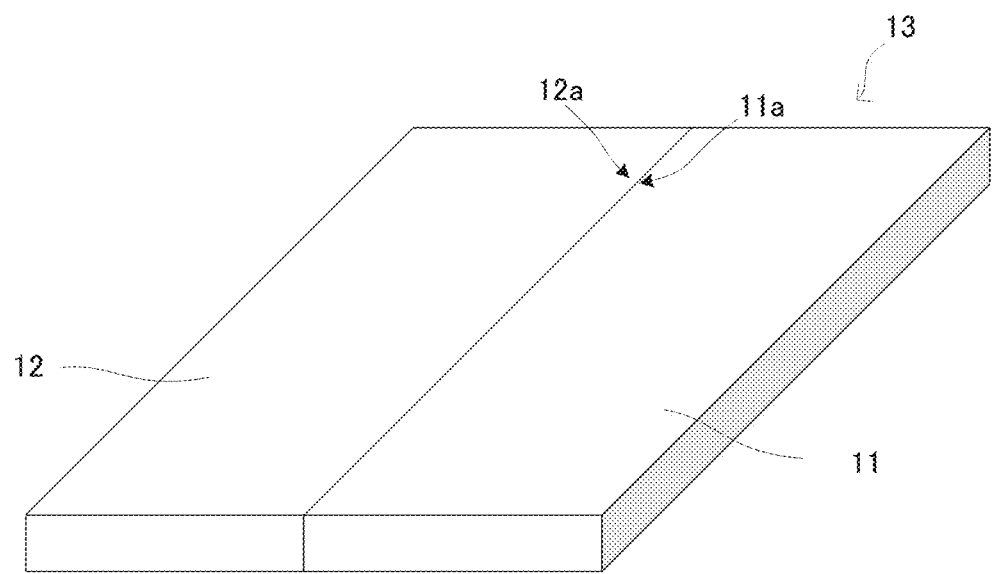
FIGS. 1A and 1B are perspective views for explaining a welding step according to an embodiment of the present invention.
Figure 1B:
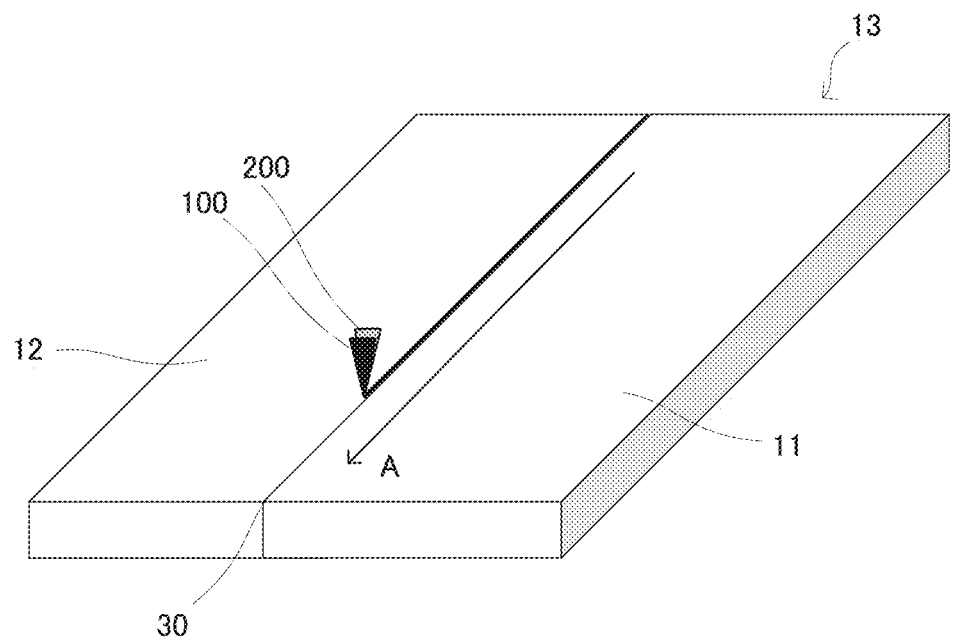

FIGS. 1A and 1B illustrate perspective views for explaining a method for producing a resin part according to the present embodiment. In the present embodiment, intermediate body 13 composed of first member 11 containing a resin, and second member 12 to which first member 11 is welded is prepared (intermediate body preparing step, FIG. 1A). In the present embodiment, region where welding is planned (herein also referred to as "welding planned region") 11a of first member 11 and welding planned region 12a of second member 12 are brought into contact with each other.

By scanning intermediate body 13 with first laser beam 100 and second laser beam 200 in scanning direction A, intermediate body 13 is irradiated with first laser beam 100 and the second laser beam 200. As a result, a resin in the vicinity of welding planned region 11a of first member 11 is partially melted or softened, and thus first member 11 is welded with second member 12 (welding step, FIG. 1B). At this time, the focal points of first laser beam 100 and second laser beam 200 may be on the front surface or the back surface of intermediate body 13, or inside intermediate body 13 in the thickness direction. Herein, a line where irradiation with first laser beam 100 and second laser beam 200 is planned also referred to as "welding planned line" 30. Welding planned line 30 may be a straight line, a curved line, or a combination of a straight line and a curved line. Herein, a straight line may be one straight line extending in any direction or straight lines extending in two or more directions. When welding planned line 30 is a curved line, scanning direction A corresponds to the tangential direction of welding planned line 30 and changes along the shape of welding planned line 30. There may be one or a plurality of welding planned lines 30. When there are a plurality of welding planned lines 30, the lines may be separated from each other or may intersect each other. In FIG. 1B, the interface between first member 11 and second member 12 corresponds to welding planned line 30.

Figure 2A:
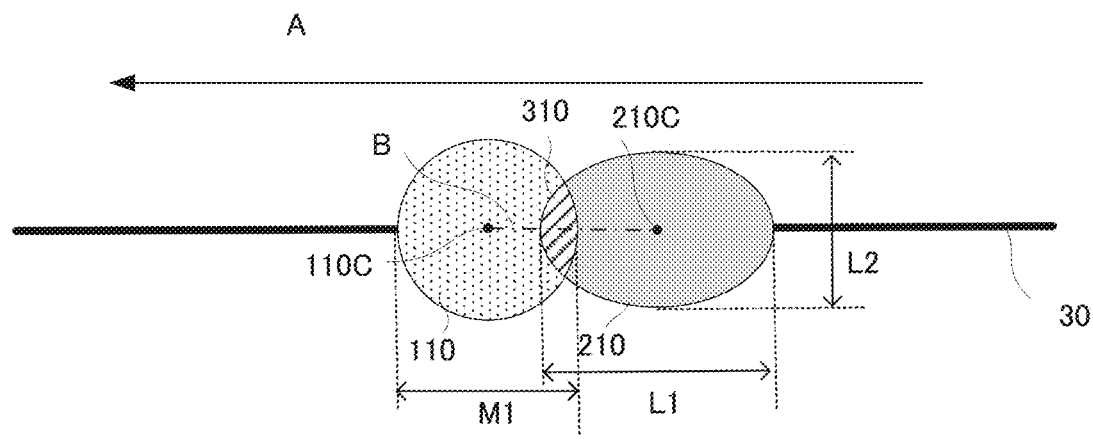
FIGS. 2A and 2B are schematic view for explaining the states of the first spot and the second spot in the welding step according to the embodiment of the present invention.
Figure 2B:
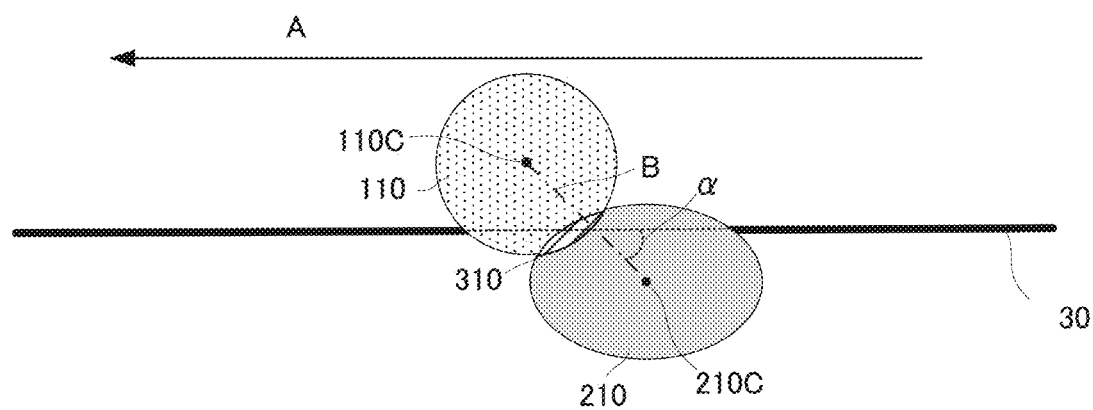

The states of first spot 110 and second spot 210 while performing the scanning with first laser beam 100 and second laser beam 200 will be described with reference to the schematic views of FIGS. 2A and 2B. In the present embodiment, as illustrated in FIGS. 2A and 2B, scanning with first laser beam 100 and second laser beam 200 is performed such that at least a part of first spot 110 and at least a part of second spot 210 overlap with each other (hereinafter, the region where first spot 110 and second spot 210 overlap with each other is also referred to as "overlapping region 310"). At this time, it is preferable that first spot 110 and second spot 210 do not completely superpose each other.

In addition, the shape of first spot 110 and/or second spot 210 is controlled in such a way that the maximum length in the direction parallel to scanning direction A is longer than the maximum length in the direction perpendicular to scanning direction A for either one or both of first spot 110 and second spot 210. In the present embodiment, second spot 210 has an elliptical shape with major axis L1 substantially parallel to scanning direction A and minor axis L2 substantially perpendicular to scanning direction A; however, first spot 110 may have an elliptical shape and second spot 210 may have a circular shape. Both first spot 110 and second spot 210 may have an elliptical shape. In addition, the shape in which the maximum length in the direction parallel to scanning direction A is longer than the maximum length in the direction perpendicular to scanning direction A (hereinafter also referred to as "shape elongated in scanning direction A") is not limited to an elliptical shape, and may be, for example, a rectangular shape. In the shape elongated in scanning direction A, the ratio of the maximum length in the direction perpendicular to scanning direction A to the maximum length in the direction parallel to scanning direction A is preferably 1:1.2 to 1:3, more preferably 1:1.8 to 1:2.5. When the ratio of the maximum length in the direction perpendicular to scanning direction A to the maximum length in the direction parallel to scanning direction A is within the range, the welding efficiency of first member 11 and second member 12 is more likely to be increased.

However, it is preferable that maximum length L1 of second spot 210 in the direction parallel to scanning direction A is longer than maximum length M1 of first spot 110 in the direction parallel to scanning direction A. It is particularly preferable that first spot 110 has a substantially circular shape and the second spot has a shape elongated in scanning direction A as in the present embodiment. When first spot 110 has a substantially circular shape, it is easy to increase the power density of the region, thereby efficiently increasing the temperature of the resin in first member 11 in a short time. When second spot 210 has a shape elongated in scanning direction A, the power density in this region becomes low, but the irradiation time of second laser beam 200 becomes long. As a result, the temperature increased by the irradiation with first laser beam 100 can be easily maintained, and the desired region of first member 11 is more likely to be melted or softened.

As described above, the positional relationship between first spot 110 and second spot 210 is as follows: center 210C of second spot 210 is on the rear side in scanning direction A as compared to center 110C of first spot 110, and parts of the spots overlap with each other. For example, as illustrated in FIG. 2A, both of center 110C of first spot 110 and center 210C of second spot 210 may be disposed on welding planned line 30. In this case, line B connecting center 110C of first spot 110 with center 210C of second spot 210 is located on welding planned line 30. The direction from center 210C of second spot 210 to center 110C of first spot 110 serves as scanning direction A.

Figure 3A:
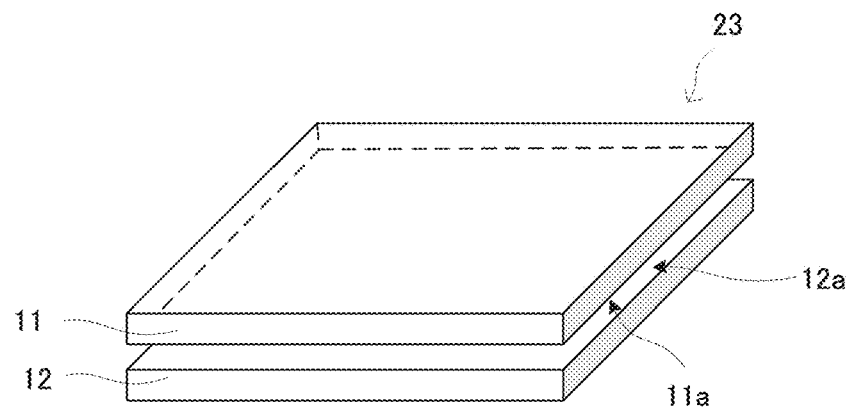
FIGS. 3A to 3C are perspective views for explaining a welding step according to another embodiment of the present invention.
Figure 3B:
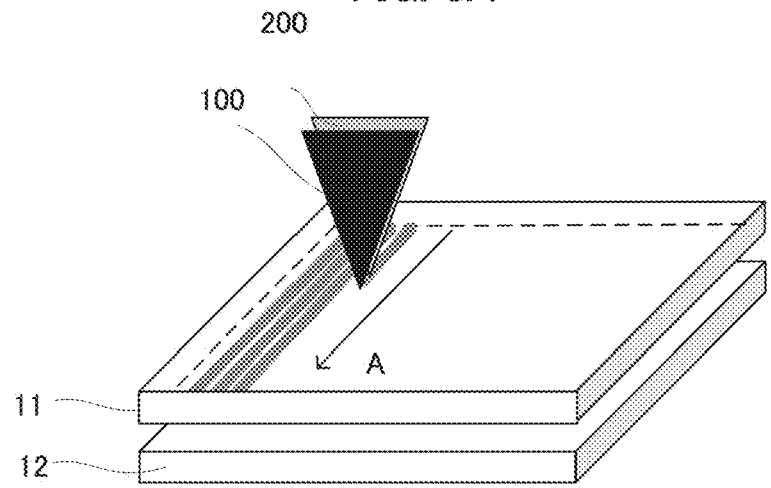

On the other hand, the following configuration is also possible as illustrated in FIG. 3B: one or none of center 110C of first spot 110 and center 210C of second spot 210 is on welding planned line 30. However, in this case, first spot 110 and second spot 210 are preferably disposed in such a way that line B connecting center 110C of first spot 110 with center 210C of second spot 210 intersects welding planned line 30. Also in this case, an acute angle (angle indicated by a in FIG. 3B) of the angles formed by line B and welding planned line 30 is preferably more than 0° and 45° or less, more preferably more than 0° and 20° or less. When the angle formed by line B and welding planned line 30 is 45° or less, it is possible to irradiate only the vicinity of welding planned line 30 with the laser beam for a long time. Specifically, when the angle is 45° or less, the following regions move on welding planned line 30: a region of first spot 110 that does not overlap with second spot 210, a region where first spot 110 and second spot 210 overlap with each other (overlapping region 310), and a region of second spot 210 that does not overlap with first spot 110. On the other hand, only the following region moves in regions away from welding planned line 30: the region of first spot 110 that does not overlap with second spot 210 or the region of second spot 210 that does not overlap with first spot 110. Therefore, the temperature of first member 11 is less likely to increase in these regions. The temperature of the resin in first member 11 only in the vicinity of welding planned line 30 can be increased; thus, welding can be performed with high accuracy.

The area of overlapping region 310 with respect to the area of first spot 110 is preferably 65% or less, more preferably 2% or more and 65% or less. An area of overlapping region 310 with respect to the area of first spot 110 being 65% or less is more likely to substantially lengthen the irradiation time of the laser beam on a desired region (for example, on welding planned line 30). Therefore, the temperature of intermediate body 13 (resin in first member 11) can be increased efficiently in a short time. In addition, an area of overlapping region 310 being 2% or more with respect to the area of first spot 110 can sufficiently broaden the region where the temperature of the resin in first member 11 can be increased. The welding strength thus can be easily increased.

The area of overlapping region 310 is preferably $72\times10^3$ µm² or less when the power density of first laser beam 100 at first spot 110 and the power density of second laser beam 200 at second spot 210 are each 0.45 kW/cm or more, the wavelength of first laser beam 100 is 350 nm or more and 400 nm or less, and the wavelength of second laser beam 200 is 400 nm or more and 460 nm or less.

Furthermore, the areas of first spot 110 and second spot 210 are appropriately selected according to the shapes of first spot 110 and second spot 210, but are preferably $110\times10^3$ µm² or more and $290\times10^3$ µm² or less. The maximum diameters of first spot 110 and second spot 210 are also appropriately selected according to the shapes of first spot 110 and second spot 210, but are preferably 380 µm or more and 960 µm or less.

The peak wavelengths of first laser beam 100 and second laser beam 200 are not limited, and can be appropriately selected according to, for example, the types of first member 11 and second member 12. For example, the peak wavelengths of first laser beam 100 and second laser beam 200 may be the same or different from each other. Setting the peak wavelengths of first laser beam 100 and second laser beam 200 to, for example, 500 nm or less can increase the temperature of intermediate body 13 (resin in first member 11) in the region irradiated with the laser beams in a short time. Further, setting the peak wavelengths of first laser beam 100 and second laser beam 200 to 300 nm or more can reduce damage such as discoloration and reduction in strength of intermediate body 13 (resin in first member 11). When first laser beam 100 and second laser beam 200 have different peak wavelengths, the temperature of intermediate body 13 can be increased efficiently, thereby efficiently welding first member 11 with second member 12. In particular, the peak wavelength of first laser beam 100 is preferably shorter than the peak wavelength of second laser beam 200. More preferably, the peak wavelength of the first laser beam is 350 nm or more and 400 nm or less, and the peak wavelength of second laser beam 200 is 400 nm or more and 460 nm or less.

In addition, a high-power optical system can be used for a laser beam with a peak wavelength of 400 nm or more. However, depending on the type, some resins may be difficult to absorb light with a wavelength of 400 nm or more. On the other hand, it is difficult to use a high-power optical system for a laser beam with a peak wavelength of less than 400 nm; however, irradiation of such a laser beam can excite the resin in first member 11 and allows first member 11 to exhibit absorption of light with a peak wavelength equal to or more than that of first laser beam 100. In other words, using a laser beam with a peak wavelength of less than or equal to 400 nm as a first laser beam and a laser beam with a peak wavelength of 400 nm or more as second laser beam 200 allows first member 11 to efficiently absorb the laser beams, thereby efficiently increasing the temperature of first member 11 in a short time. Some resins can be excited even by light with a wavelength of about 420 nm, which is longer than 400 nm. Therefore, the peak wavelength of second laser beam 200 may be set to 420 nm or more and 460 nm or less while the peak wavelength of first laser beam 100 is set to 350 nm or more and 420 nm or less.

Although the atmosphere at the time of irradiation with first laser beam 100 and second laser beam 200 is not limited, the presence of oxygen during the irradiation with a laser beam having a peak wavelength of less than 400 nm (for example, first laser beam 100) is more likely to modify first member 11. Therefore, irradiation with a laser beam having a peak wavelength of less than 400 nm is preferably performed in the presence of oxygen. Herein, "in the presence of oxygen" means that oxygen exists in the vicinity of the focal point of a laser beam, and means, for example, the case where the vicinity of the focal point of the laser beam is in an air atmosphere or an ozone atmosphere.

First laser beam 100 and second laser beam 200 may be of continuous oscillation or pulse oscillation. A laser beam of continuous oscillation is more preferred from the viewpoint that a desired region can be continuously irradiated with the laser beam. In addition, using a laser beam of continuous oscillation is more likely to reduce damage to first member 11 and second member 12 as compared to using a laser beam of pulse oscillation. As a laser beam source, for example, a high-order harmonic light source such as an Nd:YAG laser, a Yb:YAG laser, an Nd:YVO$_4$ laser, or a Ti:Al$_2$O$_3$ laser, or a laser diode can be used. In particular, using a laser diode can improve power efficiency while reducing damage to first member 11 and second member 12.

Any method may be used for forming spot 110 of first laser beam 100 and/or spot 210 of second laser beam 200 into a shape elongated in scanning direction A. Examples of such a method include adjusting the optical axis of a laser to be oblique to welding planned line 30, using a cylindrical lens, and disposing a mask between the light source and intermediate body 13.

The outputs of first laser beam 100 and second laser beam 200 are appropriately selected according to the types of first member 11 and second member 12, but are preferably W or more, more preferably 0.6 W or more. Further, the power densities of first laser beam 100 at first spot 110 and second laser beam 200 at second spot 210 are preferably 0.45 kW/cm² or more, more preferably 0.55 kW/cm² or more. The power density is a value obtained by dividing the output of the laser beam by the area of the corresponding spot.

In particular, when the wavelength of first laser beam 100 is 350 nm or more and 400 nm or less, and the wavelength of second laser beam 200 is 400 nm or more and 460 nm or less, a power density at second spot 210 being 1.2 times or more the power density at first spot 110 can efficiently increase the temperature of first member 11.

In the present embodiment, the speed at which first laser beam 100 scans in scanning direction A and the speed at which second laser beam 200 scans in scanning direction A are substantially the same. The speed may be always constant, or changed continuously or intermittently. For example, intermittently changing the scanning speed can form regions where first member 11 is strongly welded with second member 12 and regions where the welding force between first member 11 and second member 12 is low. By forming these regions, first member 11 and second member 12 can be separated from each other by a force smaller than that in the case where first member 11 and second member 12 are strongly welded together in the entire length of the welded region.

The power density of first laser beam 100 and second laser beam 200 may also be always constant, or changed continuously or intermittently. Changing the power density can also form regions where first member 11 and second member 12 are strongly welded together and regions where the welding force is low. By forming these regions, first member 11 and second member 12 can be separated from each other by force smaller than that in the case where first member 11 and second member 12 are strongly welded together in the entire length of the welded region.

Any type of resin may be used for first member 11 in the method for producing a resin part according to the present embodiment, as long as the resin can absorb the first laser beam and the second laser beam and can be heated by a photothermal reaction. A resin that is electronically excited by the irradiation with first laser beam and/or second laser beam, and changes its light absorbance may also be used. Specific examples of the resin include polyolefin resins such as polyethylene and polypropylene; polyester resins such as polyethylene terephthalate (PET); polycarbonate (PC); acrylic resins such as polymethyl methacrylate (PMMA); and fluorine resins such as polytetrafluoroethylene (PTFE), ethylene-tetrafluoroethylene copolymer (ETFE), perfluoroalkoxyalkane (PFA), perfluoroethylene propene copolymer (FEP), polyvinylidene fluoride (PVDF), polychlorotrifluoroethylene (PCTFE), and ethylene chlorotrifluoroethylene copolymer (ECTFE). First member 11 may contain only one type or two or more types of these resins. First member 11 contains a resin at least in a region to be joined with second member 12. First member 11 may contain a component other than resin in a region other than the region to be joined with second member 12.

First member 11 may have any shape, such as of a flat plate or a three-dimensional structure. The surface of first member 11 to be joined with second member 12 may be a flat or curved surface.

On the other hand, the material of second member 12 is not limited, and may be a resin or an inorganic material such as metal or ceramics.

A resin part produced by the method for producing a resin part according to the present invention may be used in any application. The resin part can be used as parts in any field in which resin members have been used conventionally. Examples thereof include clothing, various packaging containers, medical equipment, covering materials (such as electric cables and optical fibers), mechanical drive parts, bearings and washers, home appliances, information and communication equipment, automobile parts, and parts for the aviation and space industries. Examples of the resin part include parts in which resin and a component other than resin, such as metal or ceramic, are joined together. Examples of the parts in which resin and a component other than resin, such as metal or ceramic, are joined include mechanical parts, such as decorative screws, and electronic parts such as fuses and connectors.

Another Embodiment

In the above description, intermediate body 13, in which first member 11 and second member 12 are brought into close contact with each other, is prepared, and intermediate body 13 is irradiated with first laser beam 100 and second laser beam 200. However, the irradiation method using first laser beam 100 and second laser beam 200 is not limited to the above-described method.

Figure 3C:
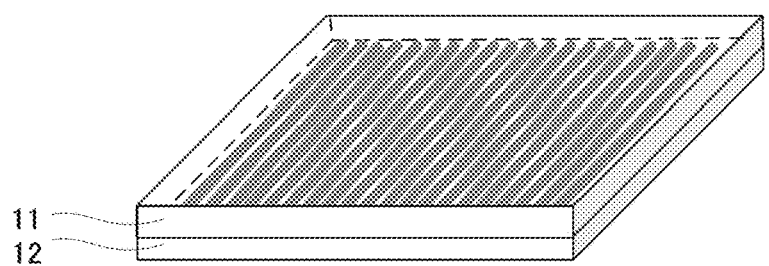

An example of another embodiment is illustrated in FIGS. 3A to 3C. In this embodiment, intermediate body 23 with a gap between welding planned region 11a of first member 11 and welding planned region 12a of second member 12 is prepared (FIG. 3A). Welding planned region 11a of first member 11 of intermediate body 23 is then scanned with first laser beam 100 and second laser beam 200 in scanning direction A (FIG. 3B). Subsequently, first member 11 and second member 12 are brought into close contact with each other, and first member 11 and second member 12 are welded together (FIG. 3C). In this aspect, first member 11 preferably allows transmission of first laser beam 100 and second laser beam 200 therethrough.

Effects

In the above-described methods for producing a resin part, the first laser beam and the second laser beam are emitted in such a way that the first spot and the second spot partially overlap with each other. In addition, either one or both of the first spot and the second spot have a shape elongated in the scanning direction of the laser beams. Therefore, the above-described methods for producing a resin part can irradiate a desired region with the laser beams for a long time, and can sufficiently melt or soften a member containing a resin even when the scanning speed of the laser beam is increased. In addition, two types of lasers are combined; thus it is possible to use laser beams of different wavelengths. For example, it is possible to use, for example, a laser beam with a peak wavelength of 400 nm or more, which is generally difficult to use for welding members containing resin. Furthermore, the above-described method does not require an additive or special treatments, thus can be applied to the production of resin parts in various fields.

EXAMPLES

Hereinafter, the present invention will be described in detail with reference to Examples, but the present invention is not limited to these Examples.

Experimental Example 1

As illustrated in FIG. 1A, intermediate body 13 is prepared. In intermediate body 13, welding planned region 11a of plate-shaped first member 11 (made of PET, with thickness of 0.5 mm) is in close contact with welding planned region 12a of plate-shaped second member 12 (made of PET, with thickness of 0.5 mm). In an air atmosphere, welding planned line 30 of intermediate body 13 was irradiated with a laser beam under the conditions shown in Table 1 below. A laser diode was used as the light source of the laser beam.

As shown in Table 1 below, only one laser beam was used for scanning in Comparative Examples 1-1 and 1-2. On the other hand, in Examples 1-1 to 1-3, first laser beam 100 and second laser beam 200 were used for scanning in scanning direction A at the same speed, and in such a way that the spots of the laser beams partially overlapped with each other. The area of a region where the first spot and the second spot overlap with each other (the area of the overlapping region) was set to $26 \times 10^3$ $\mu m^2$, and the ratio of the area of the overlapping region with respect to the area of the first spot was set to 23%. In Examples 1-1 to 1-3, the direction from the center of second spot of the second laser beam to the center of first spot of the first laser beam coincided with scanning direction A. Further, in Experimental Example 1, among the scanning speeds at which the welding strength between first member 11 and second member 12 becomes 20 N or more, the fastest speed was selected as the welding speed. The welding strength between first member 11 and second member 12 was measured by a tensile test using product model number FSA-0.5K2-500N manufactured by Imada Co., Ltd.

TABLE 1

| | First laser beam | | | | | Second laser beam | | | | | | |
|---|---|---|---|---|---|---|---|---|---|---|---|---|
| | Wavelength | Maximum length of spot in direction to scanning direction (μm) | Maximum length of spot in direction perpendicular to scanning direction (μm) | Shape | Output (W) | Wavelength | Maximum length of spot in direction to scanning direction (μm) | Maximum length of spot in direction perpendicular to scanning direction (μm) | Shape | Output (W) | Welding speed (mm/min) | Total output (W) |
| Comp. EX. 1-1 | 375 nm | 380 | 380 | Circular | 1.0 | — | — | — | — | — | 0.6 | 1.0 |
| Comp. EX. 1-2 | 375 nm | 580 | 380 | Elliptical | 1.0 | — | — | — | — | — | 1.1 | 1.0 |
| EX. 1-1 | 375 nm | 380 | 380 | Circular | 0.5 | 375 nm | 580 | 380 | Elliptical | 0.5 | 0.9~1.1 | 1.0 |
| EX. 1-2 | 375 nm | 380 | 380 | Circular | 0.5 | 405 nm | 580 | 380 | Elliptical | 0.5 | 0.9~1.1 | 1.0 |
| EX. 1-3 | 405 nm | 380 | 380 | Circular | 0.5 | 375 nm | 580 | 380 | Elliptical | 0.5 | 0.4 | 1.0 |

As shown in Examples 1-1 and 1-2 in Table 1 above, it was confirmed that the welding speed of first member 11 and second member 12 can be increased by partially overlapping the spots of the two laser beams to each other, and forming at least one of the first laser beam and the second laser beam into a shape elongated in the scanning direction. In addition, a laser beam in the ultraviolet region generally has low light conversion efficiency. Therefore, a relatively large amount of electric power is required to produce a high output laser beam in the ultraviolet region. As shown in Examples 1-1, 1-2, and 1-3 in Table 1 above, the output of a laser beam with a peak wavelength of 375 nm is 0.5 W. Therefore, in Examples 1-1, 1-2, and 1-3, it was confirmed that welding can be performed with reduced electric power compared to Comparative Examples 1-1 and 1-2. The temperature of an ultraviolet laser element is more likely to increase due to the low light conversion efficiency, and the element may be disadvantageously damaged due to the temperature rise. In Examples 1-1, 1-2, and 1-3, damage to the element can be reduced by lowering the output of the laser beam with a peak wavelength of 375 nm.

Experimental Example 2

Figure 4:
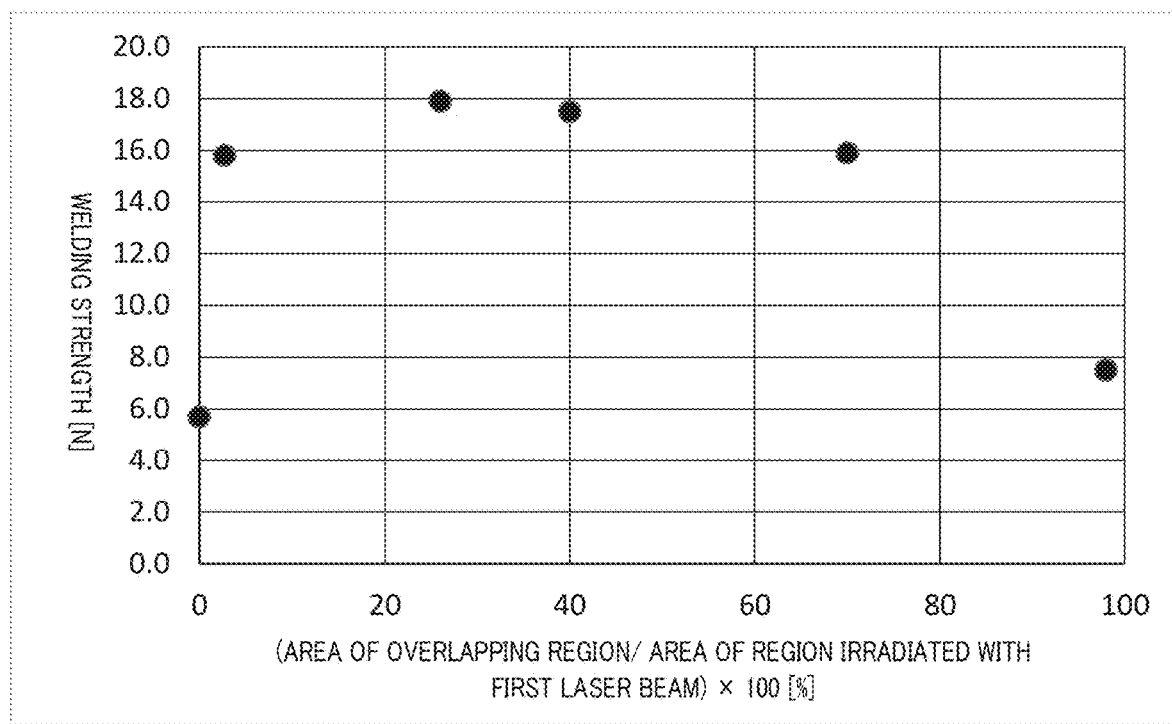
FIG. 4 is a graph showing the relationship in Experimental Example 2 of the present invention between a ratio—the ratio of an area of an overlapping region of a first spot and a second spot to the area of the first spot—and the welding strength.

First member 11 was welded with second member 12 in the same manner as in Example 1-2, except that the area of the overlapping region was changed as shown in Table 2 below. The welding strength was measured by a tensile test using product model number FSA-0.5K2-500N manufactured by Imada Co., Ltd. Results are shown in Table 2 and FIG. 4.

TABLE 2

| | Area of overlapping region (×10³ μm²) | Area of overlapping region/Area of first spot | Distance between spots (μm) | Welding strength (N) |
|---|---|---|---|---|
| Comp. EX. 2-1 | 0 | 0% | 530~ | 5.7 |
| EX. 2-1 | 2.7 | 2.4% | 450 | 16 |
| EX. 2-2 | 26 | 23% | 340 | 18 |
| EX. 2-3 | 40 | 35% | 290 | 18 |
| EX. 2-4 | 70 | 61% | 200 | 16 |
| EX. 2-5 | 98 | 87% | 120 | 7.5 |

Area of a region irradiated with the first laser beam=110×10³ μm²

Area of a region irradiated with the second laser beam=170×10³ μm²

As shown in Table 2 above, when the first spot and the second spot partially overlapped with each other, the welding strength was significantly increased. It is considered that the first member heated by first laser beam (laser beam with a wavelength of 375 nm) was irradiated with the second laser beam (laser beam with a wavelength of 405 nm) without an interval, thereby easily melting the resin in the first member. In particular, it is considered that when the area of the overlapping region of the spots is 65% or less, the irradiation time of the laser beams can be substantially lengthened, thereby increasing the welding strength.

Experimental Example 3

Figure 5:
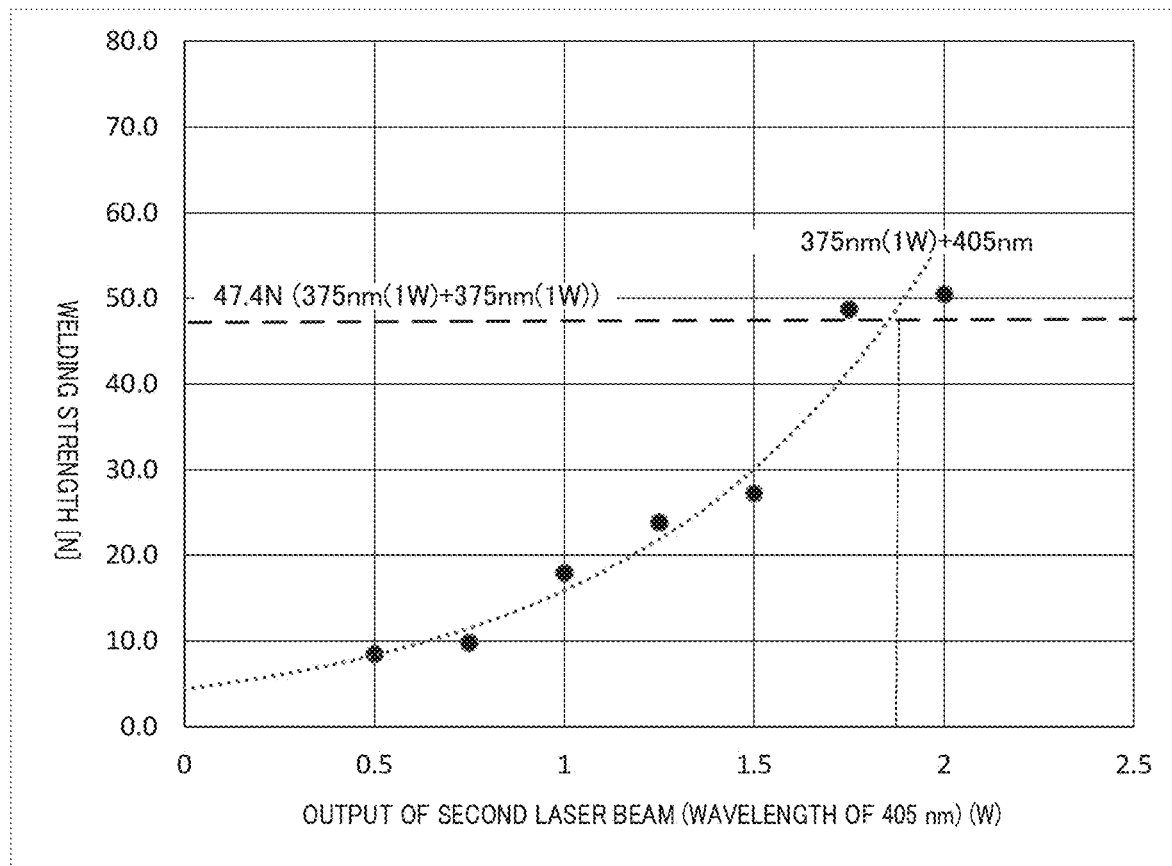
FIG. 5 is a graph showing the relationship in Experimental Example 3 of the present invention between the output of a second laser beam and the welding strength.

First member 11 was welded with second member 12 in the same manner as in Example 1-2, except that the output of the second laser beam was changed as shown in Table 3. The welding strength in this experimental example is shown in Table 3 and FIG. 5. In FIG. 5, an approximate curve is created from the results. The method for measuring the welding strength is the same as the method for measuring the welding strength in Experimental Example 2. Each power density is a value obtained by dividing the output of each laser beam by the area of the corresponding spot. As a reference example, the results when a laser beam with a wavelength of 375 nm is used as both the first laser beam and the second laser beam are also shown.

TABLE 3

| Irradiation condition | First laser beam (375 nm) Area of region irradiated: 110,000 μm² | | Second laser beam (375 nm) Area of region irradiated: 170,000 μm² | | Welding strength (N) |
|---|---|---|---|---|---|
| | Output (W) | Power density (kW/cm²) | Output (W) | Power density (kW/cm²) | |
| Ref. EX. (EX.) | 1.0 | 0.91 | 1.0 | 0.59 | 47.4 |

| Irradiation condition | First laser beam (375 nm) Area of region irradiated: 110,000 μm² | | Second laser beam (405 nm) Area of region irradiated: 170,000 μm² | | Welding strength (N) |
|---|---|---|---|---|---|
| | Output (W) | Power density (kW/cm²) | Output (W) | Power density (kW/cm²) | |
| EX. 3-1 | 1.0 | 0.91 | 0.5 | 0.29 | 8.5 |
| EX. 3-2 | 1.0 | 0.91 | 0.75 | 0.44 | 9.8 |
| EX. 3-3 | 1.0 | 0.91 | 1.0 | 0.59 | 17.9 |
| EX. 3-4 | 1.0 | 0.91 | 1.25 | 0.74 | 23.9 |
| EX. 3-5 | 1.0 | 0.91 | 1.5 | 0.88 | 27.3 |
| EX. 3-6 | 1.0 | 0.91 | 1.75 | 1.0 | 48.7 |
| EX. 3-7 | 1.0 | 0.91 | 2.0 | 1.2 | 50.5 |

As described above, a laser beam in the ultraviolet region generally has low light conversion efficiency. Therefore, a relatively large amount of electric power is required to produce a high output laser beam in the ultraviolet region. Therefore, the following configuration is particularly preferred: the first laser beam (1 W) with a wavelength of 375 nm is combined with the second laser beam with a wavelength of 405 nm, thereby achieving, while suppressing electric power, a welding strength equal to or greater than the welding strength in the case where laser beams both with a wavelength of 375 nm are combining together. As shown in Table 3 above, the welding strength of the reference example in which laser beams (1.0 W) both with a wavelength of 375 nm are combined together is 47.4 N. When the first laser beam (1 W) with a wavelength of 375 nm and the second laser beam with a wavelength of 405 nm are combined, the welding strength becomes higher than that of the reference example (47.4 N) when the output of the second laser beam is 1.9 W or more, as illustrated in FIG. 5. That is, when the power density of the second laser beam ($1.1 \times 10^3$ W/cm²) is 1.2 times the power density of the first laser beam ($0.91 \times 10^3$ W/cm²), this higher welding strength was obtained. From the results, it can be said that the power density at the second spot is preferably 1.2 times or more the power density at the first spot when the wavelength of the first laser beam is 350 nm or more and 400 nm or less (the wavelength is 375 nm in the Examples), and the wavelength of the second laser beam is 400 nm or more and 460 nm or less (the wavelength is 405 nm in the Examples). Moreover, at this time, power consumption can be significantly reduced as compared with the case of combining laser beams both with a wavelength of 375 nm together.

The method of the present invention for producing a resin part is capable of efficiently increasing the temperature of a desired region of a member containing resin, thereby welding the member to another member. Therefore, the method of the present invention is a technique particularly advantageous in producing resin parts in various fields.

REFERENCE CHARACTER LIST

11 First member
11*a*, 12*a* Welding planned region
12 Second member
13, 23 Intermediate body
30 Welding planned line
100 First laser beam
110 First spot
110C Center of first spot
200 Second laser beam
210 Second spot
210C Center of second spot
310 Overlapping region
A Scanning direction
B Line connecting center of first spot with center of second spot

The invention claimed is:

1. A method for producing a resin part, the method comprising:
    preparing an intermediate body comprising a first member and a second member, the first member containing a resin; and
    welding the first member with the second member by performing scanning of the intermediate body with a first laser beam and a second laser beam, wherein:
    when a first spot is defined as a spot of the first laser beam on a front surface of the intermediate body and a second spot is defined as a spot of the second laser beam on the front surface of the intermediate body:
        in the welding of the first member with the second member, the scanning with the first laser beam and the second laser beam is performed in a state in which a center of the second spot is located on a rear side in a direction of the scanning with the first laser beam and the second laser beam as compared to a center of the first spot while at least a part of the first spot and at least a part of the second spot overlap with each other, and
        at least one of the first spot and the second spot has a maximum length in a direction parallel to the direction of the scanning longer than a maximum length in a direction perpendicular to the direction of the scanning.

2. The method according to claim 1, wherein:
a maximum length of the second spot in the direction parallel to the direction of the scanning is longer than a maximum length of the second spot in the direction perpendicular to the direction of the scanning.

3. The method according to claim 2, wherein:
a maximum length of the second spot in the direction parallel to the direction of the scanning is longer than a maximum length of the first spot in the direction parallel to the direction of the scanning.

4. The method according to claim 3, wherein:
a power density of the first laser beam at the first spot and a power density of the second laser beam at the second spot are each 0.45 kW/cm$^2$ or more.

5. The method according to claim 4, wherein:
a ratio of an area of a region where the first spot and the second spot overlap with each other with respect to an area of the first spot is 65% or less.

6. The method according to claim 5, wherein:
the area of the region where the first spot and the second spot overlap with each other is $72\times10^3$ μm$^2$ or less.

7. The method according to claim 5, wherein:
the power density of the second laser beam at the second spot is 1.2 times or more than the power density of the first laser beam at the first spot.

8. The method according to claim 3, wherein:
in the welding of the first member with the second member, the scanning with the first laser beam and the second laser beam is performed in such a way that a region of the first spot that does not overlap with the second spot, a region of the first spot that overlaps with the second spot, and a region of the second spot that does not overlap with the first spot move on a welding planned line of the intermediate body, the welding planned line being parallel to the direction of the scanning.

9. The method according to claim 8, wherein:
a line connecting the center of the first spot with the center of the second spot intersects the welding planned line.

10. The method according to claim 9, wherein:
an acute angle of angles formed by the welding planned line and the line connecting the center of the first spot with the center of the second spot is more than 0° and 45° or less.

11. The method according to claim 3, wherein:
the direction of the scanning is identical with a direction from the center of the second spot to the center of the first spot.

12. The method according to claim 1, wherein:
a peak wavelength of the first laser beam is shorter than a peak wavelength of the second laser beam.

13. The method according to claim 12, wherein:
a power density of the first laser beam at the first spot and a power density of the second laser beam at the second spot are each 0.45 kW/cm$^2$ or more.

14. The method according to claim 13, wherein:
a ratio of an area of a region where the first spot and the second spot overlap with each other with respect to an area of the first spot is 65% or less.

15. The method according to claim 12, wherein:
the peak wavelength of the first laser beam is 350 nm or more and 400 nm or less; and
the peak wavelength of the second laser beam is 400 nm or more and 460 nm or less.

16. The method according to claim 1, wherein:
a power density of the first laser beam at the first spot and a power density of the second laser beam at the second spot are each 0.45 kW/cm$^2$ or more.

17. The method according to claim 16, wherein:
a ratio of an area of a region where the first spot and the second spot overlap with each other with respect to an area of the first spot is 65% or less.

18. The method according to claim 17, wherein:
the area of the region where the first spot and the second spot overlap with each other is $72\times10^3$ μm$^2$ or less.

19. The method according to claim 17, wherein:
the power density of the second laser beam at the second spot is 1.2 times or more than the power density of the first laser beam at the first spot.

20. The method according to claim 1, wherein:
a peak wavelength of the first laser beam and a peak wavelength of the second laser beam are different from each other.

\* \* \* \* \*